Figure 1:
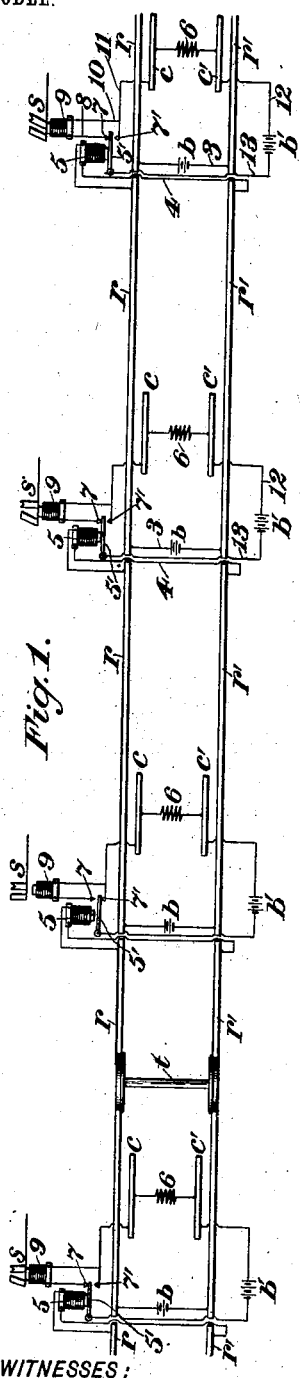

No. 735,527. PATENTED AUG. 4, 1903.
F. E. KINSMAN.
MEANS FOR CONTROLLING THE MOVEMENTS OF VEHICLES.
APPLICATION FILED DEC. 17, 1901.
NO MODEL. 5 SHEETS—SHEET 1.

WITNESSES:
INVENTOR
Frank E. Kinsman
BY
ATTORNEY

No. 735,527. PATENTED AUG. 4, 1903.
F. E. KINSMAN.
MEANS FOR CONTROLLING THE MOVEMENTS OF VEHICLES.
APPLICATION FILED DEC. 17, 1901.
NO MODEL.
5 SHEETS—SHEET 2.
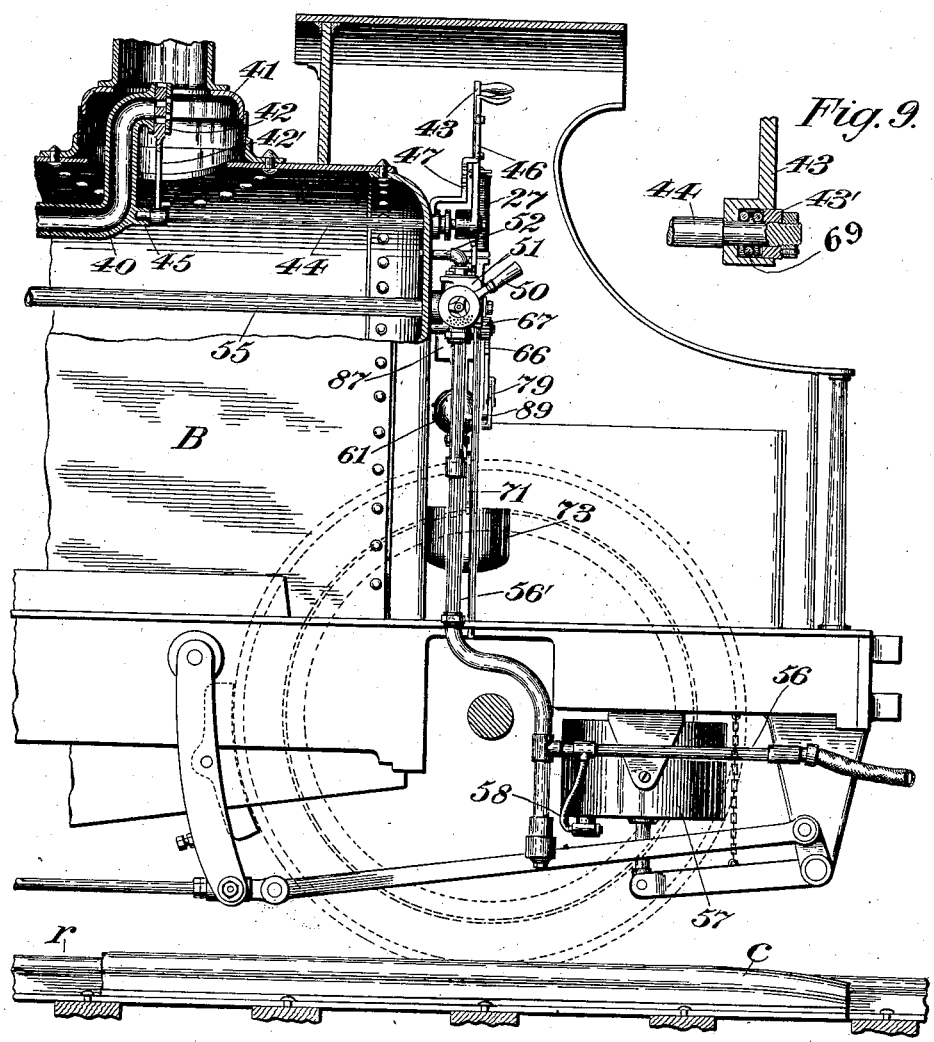
WITNESSES:
INVENTOR
Frank E. Kinsman
BY
ATTORNEY No. 735,527. PATENTED AUG. 4, 1903.
F. E. KINSMAN.
MEANS FOR CONTROLLING THE MOVEMENTS OF VEHICLES.
APPLICATION FILED DEC. 17, 1901.
NO MODEL. 5 SHEETS—SHEET 3.
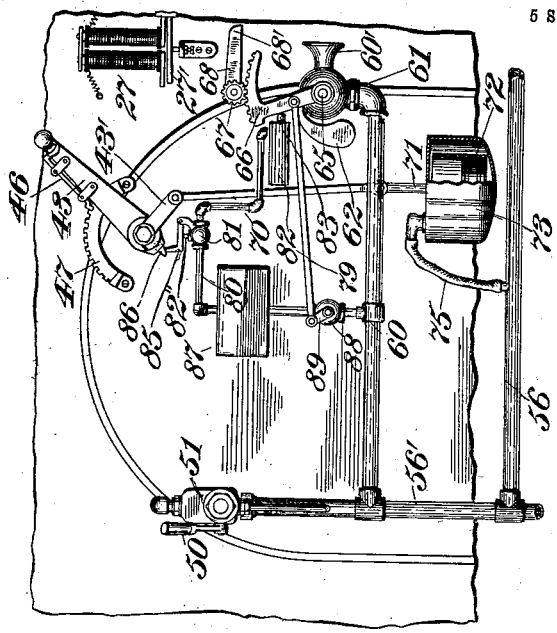
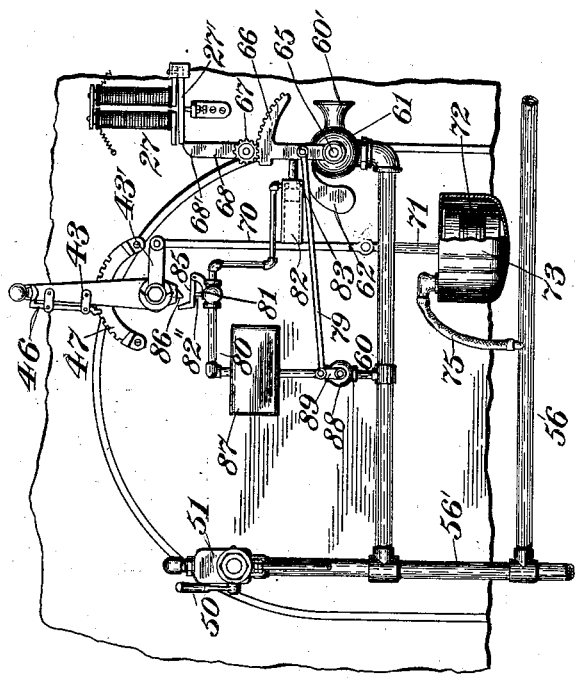
WITNESSES:
INVENTOR
Frank E. Kinsman
BY
ATTORNEY No. 735,527. PATENTED AUG. 4, 1903.
F. E. KINSMAN.
MEANS FOR CONTROLLING THE MOVEMENTS OF VEHICLES.
APPLICATION FILED DEC. 17, 1901.
NO MODEL.
5 SHEETS—SHEET 4.

WITNESSES:
J. L. Edwards
C. Champion

INVENTOR
Frank E. Kinsman
BY
ATTORNEY

No. 735,527. PATENTED AUG. 4, 1903.
F. E. KINSMAN.
MEANS FOR CONTROLLING THE MOVEMENTS OF VEHICLES.
APPLICATION FILED DEC. 17, 1901.
NO MODEL.
5 SHEETS—SHEET 5.

WITNESSES:
INVENTOR
Frank E. Kinsman
BY
ATTORNEY

No. 735,527. Patented August 4, 1903.

UNITED STATES PATENT OFFICE.

FRANK E. KINSMAN, OF PLAINFIELD, NEW JERSEY.

MEANS FOR CONTROLLING THE MOVEMENTS OF VEHICLES.

SPECIFICATION forming part of Letters Patent No. 735,527, dated August 4, 1903.

Application filed December 17, 1901. Serial No. 86,311. (No model.)

*To all whom it may concern:*

Be it known that I, FRANK E. KINSMAN, a citizen of the United States, and a resident of Plainfield, in the county of Union and State of New Jersey, have invented certain new and useful Improvements in Means for Controlling the Movements of Vehicles, of which the following is a specification.

This invention relates to means for controlling the movements of vehicles on a line of way or railway, and especially to a system for automatically controlling and stopping the movement of a locomotive or other vehicle when there is a danger condition ahead of the same, the present invention being especially designed and intended as an improvement upon the automatic train-stopping system disclosed in prior patents granted to me.

The principal object of this invention is to provide a controlling system that will operate more perfectly than the systems shown and described in said patents and in which the manual and automatic controllers for bringing the vehicle to a stop will be combined in such a manner as to secure the most perfect mutual dependence of their controlling functions without interfering with the operation thereof, the automatic controller being in turn governed by an electric circuit or circuits normally closed and of such a character as to govern the automatic controller with the utmost certainty and reduce the danger element to a minimum.

One of the principal features of the invention is an electrical system controlling a suitable electrically-operated device, such as an automatic controller, for stopping the movement of the vehicle and operating on the closed-circuit principle, so that any defect in the system will at once be indicated as a danger condition to an approaching vehicle. In the present case I have modified the operation of a normally closed track-circuit by introducing thereinto a resistance through which such circuit is normally closed, but which resistance will be short-circuited by the moving vehicle in order to permit current in the track-circuit to operate an electrical device, which in this case will be the automatic train-stopping controller. Usually the moving vehicle will have thereon a partial circuit or short circuit, including a traveling contact-maker, for engaging a track-contact in the track-circuit and short-circuiting the aforesaid resistance in the track-circuit in order that the full strength of the current in the track-circuit may traverse the short circuit on the vehicle and operate the automatic train-stopping controller, and in the preferred construction the track-circuit will include two track-contacts connected by a resistance device or coil and the short circuit on the vehicle will have two traveling contact-makers therein, preferably one at each terminal of the short circuit, these two contact-makers serving to short-circuit said resistance in the track-circuit by simultaneously engaging the two track-contacts connected by said resistance. This resistance, which is short-circuited by the moving vehicle, is included in a track-circuit which preferably has two branches, one of these being the normal track-circuit-closing branch, while the other is a danger-signaling branch. The normal branch and the danger-signaling branch are electrically differentiated from each other in any suitable manner, the normal branch being in this case of high resistance, while the danger-signaling branch is of low resistance, and hence when the moving vehicle short-circuits the resistance before mentioned and at the same time the high-resistance branch is displaced in the circuit at the track by the low-resistance danger-signaling branch the electrically-controlled device or automatic train-stopping controller is operated by the working current of the system—that is, by current traversing a circuit containing none of the controlling resistances through which the circuit is normally completed. Under all of these conditions, however, whether there be no controlling resistance in the track-circuit or whether there be one controlling resistance in the track-circuit or whether there be more than one controlling resistance in such circuit, this controlling track-circuit is always normally closed, and each of its controlling and working functions is governed by a closed circuit, for which reason any defect in the system will be immediately manifested as a danger condition, and a danger condition will always operate the electrical device controlled by the aforesaid short circuit, and hence in the present system will always stop the vehicle or train.

Another important feature of my invention relates to the resetting of the automatic controller governing the movement of the vehicle after such controller has been operated to stop the vehicle because of a danger condition ahead of the same. The leading feature of my safety system as disclosed in the patents heretofore granted to me is the provision, in connection with a manual controller for normally governing the movement of a vehicle or train on a line of way or railway, of an automatic controller governed by a danger condition ahead of the vehicle and adapted to stop the same automatically; but in former embodiments of this system it has been difficult for the engineer or motorman to reset the automatic controller and resume control of his train. The most important feature of this part of my present invention is an automatic-controller-resetting device or automatic-controller-resetting means governed by the manual controller, and hence under the control of the engineer, whereby he may reset the automatic controller in working position without loss of time after such automatic controller has operated and proceed with his vehicle or train with the automatic controller in readiness for stopping the vehicle again automatically on meeting another danger condition. This automatic controlling means is ordinarily employed for controlling both the motive power and the brake or brakes of a power-operated vehicle, and hence the resetting means will usually coöperate with automatic power-controlling and brake-controlling mechanism, separate automatic power and brake controllers being employed ordinarily and having a common actuating device governed by a danger condition on the line of way. In locomotive work the automatic power-controller will govern the closing of the throttle-valve and the automatic brake-controller will govern the application of a fluid-pressure brake or brakes, such as a compressed-air brake or a vacuum-brake, the latter of which especially may be applied instantaneously and controlled with the highest degree of precision. In all of the embodiments thereof I make use of an automatic controller having a controlling action of gradually-increasing efficiency as distinguished from the quick-action automatic controllers disclosed in my prior patents in order that the automatic controlling action may be gradually exerted and the main steam-pipe throttled and the brakes applied somewhat gradually instead of violently, this progressive increase in the efficiency of the throttle-valve and brake-controlling means serving to prevent unnecessary straining of the mechanism and the violent shaking of the passengers.

Other features of my invention relate to improvements in the traveling contact-maker, the track-contact coöperative therewith, and coacting parts, and these and other features of my invention not hereinbefore referred to will be hereinafter described and are illustrated in the accompanying drawings, in which—

Figure 2:
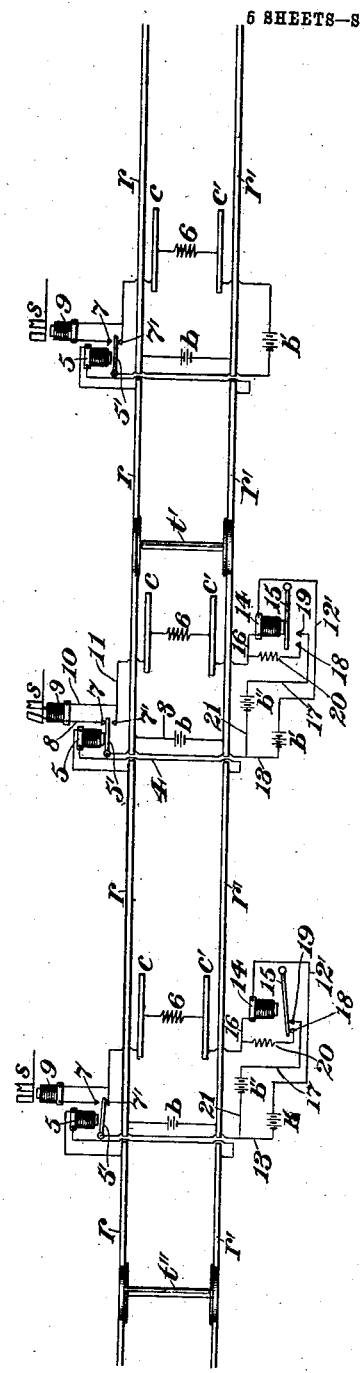
Figure 6:
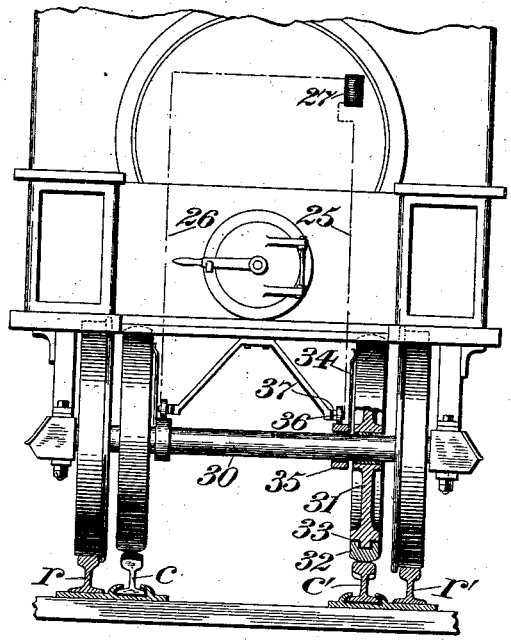
Figure 7:
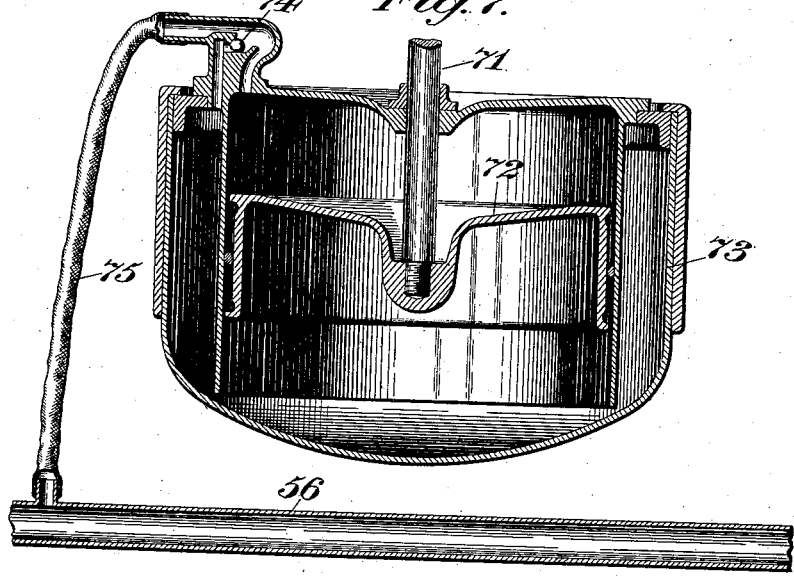
Figure 8:
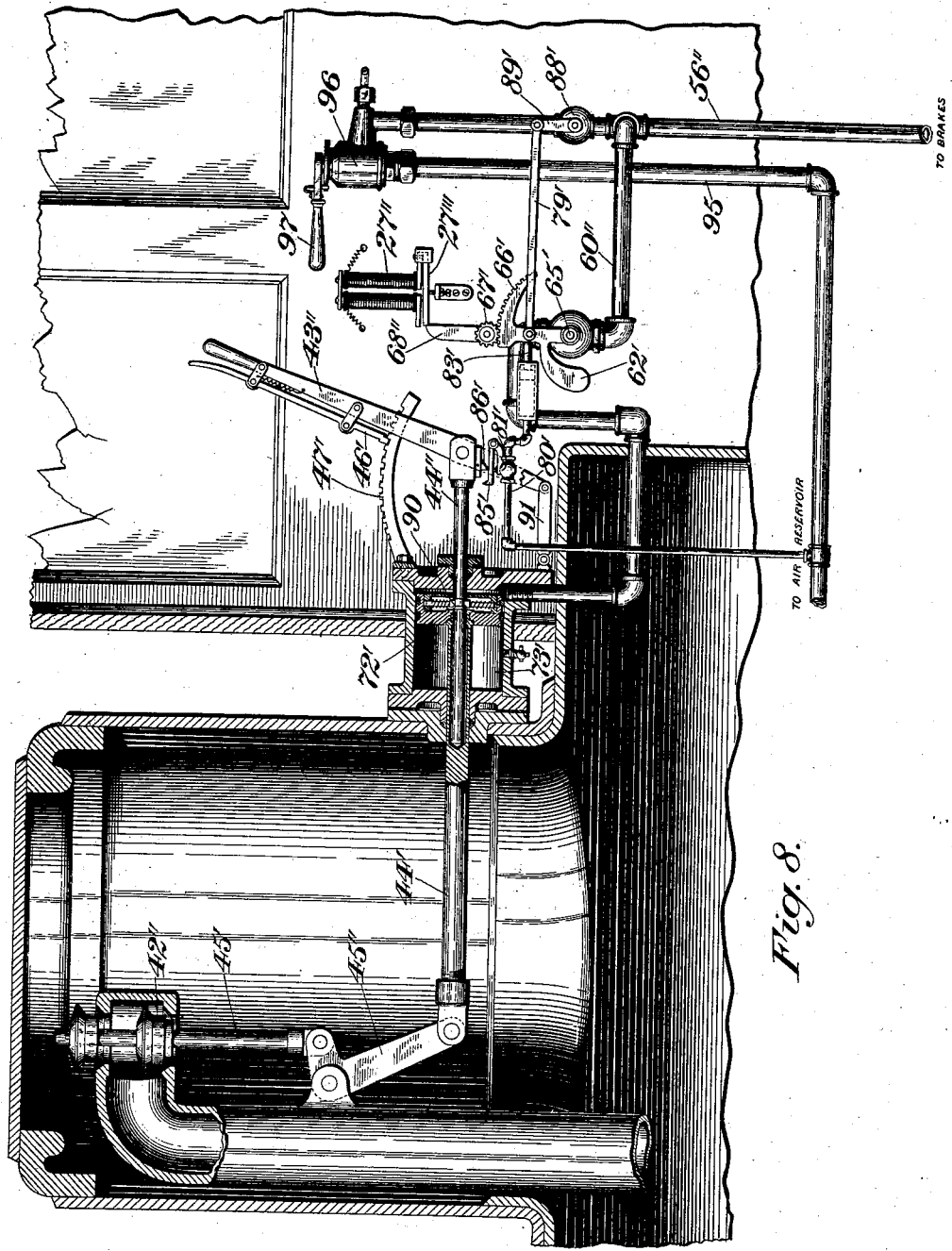

Figure 1 is a diagram of a portion of a railway-track controlled by an electrical block system embodying my invention. Fig. 2 is a similar view of another section of track having a block system applied thereto, illustrating a modification of the invention. Fig. 3 is a sectional side elevation of a portion of a locomotive-cab and associated parts, illustrating my invention in connection with a vacuum-brake system. Fig. 4 is a rear view of a portion of the mechanism shown in Fig. 3 and illustrates the automatic controlling means and the resetting means in their normal positions. Fig. 5 is a similar view illustrating the automatic controlling means in its working position with the brake system open to the atmosphere and the steam cut off. Fig. 6 is a sectional rear elevation of a portion of a locomotive-engine, illustrating the short circuit on the vehicle and the traveling contact-makers coacting with the track-contacts. Fig. 7 is an enlarged sectional detail illustrating the throttle-closing vacuum device connected with the train-pipe. Fig. 8 is a sectional side elevation of a portion of a locomotive-cab, illustrating my invention adapted for use with a compressed-air-brake system and shows the automatic controller in its normal position. Fig. 9 is an enlarged detail.

Similar characters designate like parts in all the figures of the drawings.

Referring first to Figs. 1 and 2, I have illustrated in these views an improved electrical block system for controlling the movement of a vehicle or train traveling therealong by signaling to it or bringing such vehicle or train to a stop when there is a danger condition in either direction. The term "danger condition" is intended to include any condition of the line of way which would render the running of the train past a given point hazardous—such, for example, as the presence of another vehicle or train on the block ahead, an open switch, an open drawbridge, a washout, a defect in or interruption of the controlling-circuit, &c. In the drawings of the present application, however, the only danger condition illustrated is the presence of another vehicle or train on the block ahead, such vehicle being indicated by the axles $t$, $t'$, and $t''$. The line of way may be the usual railway-track, one of the tracks being illustrated herein, both of the rails of said track constituting in this instance sectional conductors forming parts of the corresponding block-circuits. The rails of each block are designated by $r$ and $r'$, respectively, and in each case they are preferably connected in a normally closed circuit, which may be formed by a conductor 3, having a source of energy or battery $b$ therein at the end of the block, and a conductor 4, having a device, such as the electromagnet 5, therein for controlling a track-circuit governing the operation of another electrical device, which in the present system is the automatic controller for stopping the vehicle or train, this electromagnet 5 being located at the entrance of the block, and hence governing a track-circuit at the end of the block in the rear of the block-circuit of said electromagnet. I prefer to make use of a block-circuit substantially such as that just described for controlling a track-circuit governing the operation of the automatic controller for stopping the vehicle, although it will be evident that a block-circuit will indicate but one type of danger condition ordinarily, and hence constitutes but one means for controlling a track-circuit in accordance with my invention. I make use of any suitable type of track-circuit for governing the action of the electrically-operated device or automatic train-stopping controller subject to the influence of such circuit, provided that this track-circuit is normally closed and includes a resistance adapted to be short-circuited by the moving vehicle whether said track-circuit is or is not controlled by a block-circuit in advance thereof, it being only necessary that such track-circuit shall be capable of indicating some form of danger condition ahead of the moving train. A simple closed track-circuit having a resistance therein adapted to be short-circuited by the moving vehicle is sufficient for the purpose of governing the operation of the automatic train-stopping controller, this track-circuit usually including one or more track-contacts in the path of one or more traveling contact-makers on the vehicle, the preferred construction being that in which two track-contacts in the form of short rails, such as $c$ and $c'$, are disposed side by side and are connected to a resistance or coil 6. With this type of track-circuit two traveling contact-makers on the vehicle should coöperate, such traveling contact-makers being connected in a circuit capable of short-circuiting the resistance 6 in order to receive the full strength of the current. The preferred type of track-circuit, however, has two differentiated branches through which currents having different characteristics may flow, one of these branches being in this case a high-resistance track-signal-operating branch, which is normally closed and through which current normally flows for the purpose of holding a track-signal, such as a semaphore $s$, in a clear or safety position, while the other branch of said track-circuit is usually of low resistance, is normally open, and is closed only when the high-resistance branch is rendered ineffective, usually by being cut out of circuit. In the present system both of these branches are controlled by the armature 5' of the electromagnet 5, this electromagnet and its armature constituting a relay governing the normal controlling function and also the differentiated, working, or emergency function of the track-circuit, it being evident that when the closed circuit is through the working branch of low resistance a current of maximum efficiency or strength will influence the automatic train-stopping controller when the latter is in the field of action of the track-circuit. Here the armature 5' is normally in contact with a terminal 7, which is connected, by means of a conductor 8, with a resistance 9, which in the present case is in the nature of a track-signal-operating electromagnet and from which the conductor 10 extends to a conductor 11, connected with the track-contact $c$, the circuit being continued through the resistance 6, the other track-contact $c'$, and conductor 12, leading to a battery $b'$, the circuit being completed to the armature 5' by a conductor 13. When the armature 5' of the relay is released, owing to the existence of a danger condition ahead—as, for example, the presence of a train $t$ on the block ahead—the armature 5' drops, thus cutting out the high-resistance track-signal-operating branch of the circuit, causing the signal $s$ to move to the danger position, and at the same time cutting in the low-resistance working circuit, owing to the armature 5' engaging the contact 7' practically instantaneously. The engineer of an approaching train is thus warned by the signal $s$ that there is a danger condition ahead, and unless he stops his train before reaching the track-contacts $c$ and $c'$ the working current in the track-circuit will pass through the circuit on the train on the engagement of the traveling contact-makers thereof with the track-contacts and the automatic controlling device will be operated and the train automatically stopped by devices hereinafter described, practically all of the resistance of the track-circuit being eliminated at this time, owing to the short-circuiting of the resistance-coil 6 and the cutting out of the high-resistance track-signal-operating electromagnet 9.

The improvements herein illustrated are embodied in a block system of the usual three-position type—that is, a block system having signals in which the signal for each block may show either "danger," "safety," or "caution" or "clear," according as there is a train on the first, second, or third block in advance of the approaching train. The different positions of the track-signals for indicating these different conditions and the different conditions of the train-signaling track-circuits for correspondingly stopping an approaching train automatically or permitting it to continue on its way are clearly illustrated in the views.

I have also shown in Fig. 2 a modification of the train-signaling track-circuits for the purpose of automatically throwing into action a reserve source of energy or battery when the normal source of energy or battery for any reason fails to operate or the circuit thereof is interrupted. Here the armature 5', the contacts 7 and 7', the high-resistance and low-resistance branch circuits connected with the conductor c, the resistance-coil 6, and the short conductors or track-contacts c and c', together with the conductor 13, are the same as hereinbefore described; but the main battery b' is connected by means of a conductor 12' with an electromagnet 14, which is connected by a conductor 16 with the track-contact c', said electromagnet, with its armature 15, constituting a relay controlling the reserve source of energy. This reserve source or battery b'' is preferably placed in a branch circuit of the same resistance as the branch containing the main battery, the battery b'' in this instance being connected to the conductor 13 by a conductor 21, the other pole of the battery being connected by a conductor 17 to one terminal 19 of a pair of terminals controlled by the armature 15 of the relay, the other terminal 18 of said pair being connected to a resistance 20, which in turn is connected to the conductor 16, leading from the electromagnet 14. The resistance of the coil 20 is so adjusted as to equalize the resistances in the two branch circuits, and whenever the current or circuit through the main branch fails a reserve source of energy located in a reserve branch of the same resistance as the main branch will be thrown automatically into circuit and will maintain its section of the system in an operative condition.

A simple type of electric circuit, with its included traveling contact-makers, may be employed on the traveling vehicle or train for coöperation with the track-circuit or track-circuits and the track-contacts shown therein. In the present case this short-circuit on the vehicle includes only the contact-making or current-collecting devices and a pair of conductors 25 and 26, leading therefrom to opposite terminals of an electrical device or electromagnet, such as 27, constituting the main element of the present automatic controlling means for stopping the vehicle. Two similar traveling contact-makers are illustrated in Fig. 6, these being in the present case collecting-wheels carried by one of the forward axles, such as 30, of the vehicle between the main wheels of said vehicle, the main portions of these wheels—that is, the web portions thereof—being usually of metal, as indicated at 31, while the outer portions or rims 32 of such wheels, also of metal, are separate from the web portions and are insulated therefrom substantially as shown at 33, the two portions of the wheel being connected to form a so-called "steel-tired" wheel. These collecting-wheels are journaled on the axle 30, so as to be free to turn thereon, and the current may be transmitted from the rim 32 by means of a collecting-arm or spring-contact 34, secured to a collecting-ring 35, fixed on but insulated from the axle 30, a small collecting-wheel 36 in contact with the collecting-ring 35 and loosely mounted on an insulated stud, such as 37, serving to transmit the current to such stud and thence to the corresponding conductor 25 or 26.

In order that the contact-making wheels may operate properly when the track-contact rails c and c' are covered with ice or snow or other insulating foreign medium, I prefer to employ contact-wheels the peripheries of which are slightly convex in cross-section, a rim of this construction operating to cut through and remove such foreign substances, and thus maintain a clean contact-surface.

For the purpose of preventing unnecessary pounding of the contact-making wheels against the contact-rails the latter are preferably vertically inclined at one or both ends upward toward the center of such rail, and in this way the wear and tear due to the shock of contact is greatly reduced.

The devices hereinbefore described may be employed for governing the movement of a vehicle either by controlling the motive power of the vehicle to cut off such power or by applying the brake or brakes of the vehicle or by performing both of these functions. In prior patents granted to me I have illustrated this controlling mechanism governing the operation of the throttle-valve of a locomotive and also the ordinary air-brake system controlled by the engineer of a railway-train. In the present application I have illustrated for the first time how the automatic brakes of a vacuum-brake system may be applied automatically when there is a danger condition ahead of the vehicle or train. I have also illustrated how the controlling means for automatically applying the brakes when there is danger ahead may be reset in its operative position by a manual controller or engineer's throttle-lever after the vehicle has been checked automatically and the engineer wishes to proceed under cautionary conditions or on the removal of such danger condition.

In Figs. 3, 4, and 5 I have shown automatic controlling means for applying the brake or brakes of a vacuum-brake system when there is a danger condition ahead of the vehicle, and I have also illustrated in these views resetting means governed by a manual controller, usually the throttle-valve lever, for restoring the automatic vacuum-brake-controlling means to a normal position in readiness for stopping the train again in another emergency. The application of this feature of my invention (illustrated in Figs. 3, 4, and 5) is in connection with a locomotive deriving its power from a steam-boiler, the boiler being designated by B and having the usual main steam-pipe 40, extending into the steam-dome 41 and controlled by a slide-valve for throttling the flow of steam into such pipe. Normally this throttle-valve 42 is operated by a manual power-controller or throttle-valve controller in the form of a throttle-lever 43, secured to a shaft 44, journaled at one end in a wall of the boiler and at its other end in a bored projection 45 on the steam-pipe 40, said shaft having at its inner end a short crank-arm, to which the lower end of the throttle-valve rod 42' is connected. The throttle-lever 43 in this instance is held at any point to which it may be moved by a detent 46, shiftable by a spoon-handle on said lever into engagement with a locking-segment 47, fixed adjacent thereto. The manner in which this throttle-lever is operated by the engineer is evident.

The vacuum-brake system controlling the application of a brake or brakes to one or more wheels of a vehicle or train is preferably substantially the same as that ordinarily used, except in so far as it is modified by the application of the automatic brake-controlling means thereto governed by a danger condition on the line of way and except also as it is modified by the application thereto of automatic-controller-resetting means governed by the manual controller or throttle-lever, the manual brake-controller or engineer's brake-handle being preferably of the ordinary type. This manual brake-controller is designated by 50 and governs the operation of the usual large and small ejectors (not shown) contained within a casing 51 and supplied with steam—as, for example, by means of a pipe 52, extending directly to the boiler—these ejectors serving, according to the position of the brake-handle 50, to eject a greater or less amount of steam, and hence to withdraw air from the pipes and other spaces of the vacuum system more or less rapidly. An exhaust-pipe 55, which may extend from the casing 51 into the chimney of the locomotive (not shown) withdraws the air from the upright portion 56' of the main pipe or train-pipe 56 to maintain a vacuum therein and in the vacuum-cylinders, such as 57, by means of which the brakes are normally held off, communication between each vacuum-chamber 57 and the train-pipe 56 being preferably made in the usual manner by a flexible pipe 58. In the ordinary operation of the brake system a quick application of the brakes is made by throwing the brake-handle 50 to its extreme horizontal position to the right, as seen in Fig. 3.

The automatic control of the stopping of the vehicle is preferably effected by controlling means common to the motive power and the brake system of the vehicle, a common controlling-valve for the throttle-valve of the fluid-pressure engine or steam-engine and for the fluid-pressure brakes of the brake system being ordinarily placed in a suitable pipe of the vacuum system for the purpose of automatically admitting air to the pipes of such system when the emergency arises and operating the brakes by atmospheric pressure in said pipes and also operating the throttle-valve to close the same by atmospheric pressure. In the construction shown a branch pipe 60 leads from the upright portion 56' of the train-pipe and preferably has a flaring inlet 60', normally closed by a valve contained in a casing 61 between the flaring inlet and the main portion of the pipe 60. This valve is held closed by means controlled by a short circuit on the vehicle, and is opened automatically whenever a working current sufficient to release the valve-holding means passes through the short circuit on the vehicle, the armature 27' of the electromagnet 27 constituting in this case a detent for engaging the valve-holding means, while an actuator, such as a weight 62, normally tending to open such automatic valve, will operate the same as soon as the valve is released by the armature 27'. The weight 62 constitutes an automatic-controller actuator normally tending to open the automatic vacuum-relieving brake-valve just described, and in connection with such actuator I deem it desirable to employ means for retarding the controlling action, so that it will be progressively or gradually effective, the vacuum-reducing valve closing gradually in this construction in order that it may have a progressively or gradually increasing efficiency during its vacuum-reducing action. I prefer to oppose a gradual resistance to the operation of the automatic power-controlling and brake-controlling means by gearing the stem 65 of the vacuum-reducing or automatic relief-valve to the valve-holding means hereinbefore described as normally held by the armature or detent 27'. Here the valve-stem 65 has a gear-segment 66 secured thereto and meshing with a pinion 67, secured to a pivoted detent 68, preferably having a rounded face 68' opposite its holding-face in order that it may lift the armature 27' without undue friction. The pinion 67 and the segment 66 should mesh somewhat closely in order to assure a gradual opening of the automatic valve and a consequent gradual admission of air through the inlet 60', a gradual closing of the throttle-valve, and a gradual application of the brakes, whereby the vehicle or train may be brought to a stop automatically, but somewhat gradually and without violently shaking up the passengers and unnecessarily straining the mechanism. By employing a flaring inlet 60' the atmospheric pressure in the pipes will be exerted in the shortest space of time, and hence the stopping of the train will be accomplished with corresponding speed. After the vehicle has been stopped and the danger condition removed it should be possible for the engineer to proceed instantly with all of the controlling mechanism in readiness to stop the train again automatically, and for this reason some means should be employed for resetting the automatic controlling device or devices quickly after the train has been checked. A manual controller in the engineer's cab is employed for this purpose and governs the operation of the resetting means, said manual controller being preferably the throttle-lever 43. In this construction said lever is not moved when the vacuum in the system is reduced by the opening of the automatic relief-valve, said lever having in this case an angle-arm 43', normally frictionally coupled thereto, as by means of the spring 69 and its adjusting-nut, said angle-arm being connected by a rod 70 to a piston-rod 71, operated by a piston working in a vacuum-chamber, this piston 72, the vacuum-chamber 73, and a controlling ball-valve 74 in a space leading to said vacuum-chamber being substantially similar in all respects to the corresponding vacuum mechanism for operating a vacuum-brake, except that the vacuum mechanism for closing the throttle-valve is considerably smaller than that for operating a brake. This vacuum-chamber 73 may be connected in the usual manner with the train-pipe 56 by a flexible pipe 75. When the automatic relief-valve is open and atmospheric pressure is operative in the train-pipe, the piston 72 will be lowered quickly to the position shown in Fig. 5 and the arm 43' turned to close the throttle-valve, but without turning the throttle-lever. As the pressures at opposite sides of the piston 72 are balanced during the ordinary running of the train and as this piston is of small size, but little additional effort need be exerted by the engineer to throw the throttle-lever either way.

The resetting means for closing the automatic controlling-valve or relief-valve will preferably be controlled by fluid-pressure from a suitable source—as, for example, by atmospheric pressure—the pressure of the air being governed by a valve operated by such manual controller when the engineer desires to start his vehicle or train again. This fluid-pressure controls the closing movement of the automatic vacuum-reducing or relief-valve and also the resetting of all of the elements of the automatic controlling means in operative condition, a pipe 80 being shown herein and having at one point a fluid-pressure-controlling valve 81, while one end of the pipe leads into a small cylinder 82, open at one end and containing a piston having a valve-resetting plunger 83 secured thereto and projecting through the other end of the cylinder. At its other end the pipe 80 is connected to the pipe 60, and at intermediate points it contains an auxiliary vacuum-chamber 87 and a normally open valve 88, controlling said vacuum-chamber and movable with the automatic relief-valve, said valve 88 having an arm 89 extending from its stem and connected to the gear-segment 66 by a link or rod 79, these two valves being so connected and operated that the valve 88 closes before the relief-valve opens, and thus prevents the reduction of the vacuum in the chamber 87. On the opening of the automatic relief-valve the plunger 83, with its piston, will be pushed back, as shown in Fig. 5, by the action of the weight 62; but when the valve 81 is opened the space in advance of the piston of the plunger 83 is exhausted and the atmospheric pressure behind the piston is sufficient to overcome the pull of the weight 62 and force the segment 66 to the position shown in Fig. 4, said segment operating to return the stop-arm 68 to its normal position, with the holding-face thereof in engagement with the armature or detent 27, and also to open the valve 88 again on the closing of the relief-valve.

It is desirable to open the valve 81 when the engineer operates his throttle-lever to open the throttle-valve, and hence the fluid-pressure-controlling valve 81 should be opened by the throttle-valve controller when the engineer throws said controller to start his vehicle or train. For the purpose of actuating said valve 81 I have shown at 85 a short hooked lever resting on the stem 82'' of the valve 81 and operative to open said valve by depressing said valve-stem, while the lever 43 has at the lower end thereof a by-pass actuator or pawl 86, which in moving from the wide-open to the closed position of the throttle-lever passes by the hooked end of the lever 85, but in moving from the closed to the open position forces said hooked lever down and opens the valve 81, whereupon the air is exhausted into the chamber 87 and the piston 83 is moved by atmospheric pressure to reset the gear-segment 66 and the parts controlled thereby.

Except in so far as it is modified by the application of the resetting mechanism thereto the automatic controlling means for use with the compressed-air-brake system is similar to that shown, described, and claimed in my prior patents hereinbefore mentioned. In Fig. 8 I have illustrated such a compressed-air-brake system with my improvements applied thereto and to the throttle-valve of a locomotive-engine. In this view the throttle-valve is designated by 42'' and the valve-stem 45' is connected at its lower end to the usual angle-lever 45'', which in turn is connected to a piston-rod 44', secured to a piston 72', working in a cylinder 73', said piston-rod having a tubular end in which works a complementary piston-rod 44'', controlled by the usual manual-power controller or throttle-lever 43''', said piston-rods 44' and 44'' having the usual slip-joint or clutch connection 90 to permit the automatic controlling means to move the piston 72' and the piston-rod 44' to close the throttle-valve without operating the throttle-lever or the piston-rod 44'', connected thereto, by means of which the piston 72' and the piston-rods 44' and 44'' are operated under normal conditions. The lever 43'' is normally locked in any desired position by a spring-pressed locking-detent 46' engaging a toothed locking-segment 47'. At its lower end the lever 43'' is pivoted to a guide-link 91, connected to a fixed point. The resetting mechanism controlled by this throttle-lever is similar in nearly all respects to that hereinbefore described; but the by-pass actuator or pawl is carried in this case by the piston-rod 44″, as indicated at 86′. Said by-pass pawl is intended to pass by the hooked end of the lever 85′ when the throttle-lever is thrown to the left, as seen in Fig. 8—that is, to its closed position—and depresses said lever and opens the resetting-valve 81′ when returned to its open position. This valve 81′ controls a pipe 80′, leading from any suitable source of fluid-pressure, which pipe has at its end a piston operating a plunger 83′, controlling the closing movement of a valve-operating segment 66′, having a valve-opening weight 62′ secured thereto, said segment meshing with a pinion 67′, carrying a stop-arm 68″, normally held by the armature 27‴ of the controlling electromagnet 27″, included in the short circuit on the vehicle. In the present case, however, the automatic relief-valve controlled by the segment 66′ is in a pipe 60″, leading from the rear end of the cylinder 72′ to the brake-pipe or train-pipe 56″ of a compressed-air-brake system, normally in communication with a pipe 95, leading to an air-reservoir, (not shown,) communication being effected through the usual three-way valve in the casing 96 when the manual controller or brake-handle 97 is properly turned. When the automatic relief-valve, the stem of which is indicated at 65′, is turned by the weight 62′, the pressure in the train-pipe will be let off through the pipe 60″ and the piston 72′ will be moved to the left, slipping the connection at 90, and the throttle-valve will be closed. The air in the cylinder 73′ is permitted to escape through an exhaust-port, which is preferably regulable and is in an exhaust-cock similar to that shown in my prior patent, No. 492,402. In order to prevent loss of pressure in the air-reservoir, the pipe 56″ has a valve 88′ therein above the point of connection of the pipe 60″, and this valve is operated from the gear-segment 66′ by a link or rod 79′, connected to an arm 89′ of said valve, this valve 88′ preferably closing immediately in advance of the opening of the automatic relief-valve.

Many of the details of construction may be modified greatly without departing from the invention, the collecting-wheels, for example, being replaced in some cases by sliding contact-shoes, such as those employed in many third-rail systems.

What I claim is—

1. The combination with a line of way and with a vehicle movable therealong, of a normally closed track-circuit including a resistance, an automatic controller governing the movement of said vehicle, and a short circuit governing the operation of said controller and controlled by current in the track-circuit and adapted to short-circuit said resistance.

2. The combination with a line of way and with a vehicle movable therealong, of a normally closed track-circuit including a resistance and having a normally open danger-signaling branch, an automatic controller governing the movement of said vehicle and governed by said danger-signaling branch, and a short circuit governing the operation of said controller and controlled by said track-circuit and adapted to short-circuit said resistance.

3. The combination with a line of way and with a vehicle movable therealong, of a normally closed track-circuit including a resistance, manual and automatic controllers governing the movement of said vehicle, a short circuit governing the operation of said automatic controller and controlled by current in the track-circuit and adapted to short-circuit said resistance, and automatic controller-resetting means governed by said manual controller.

4. The combination with a line of way and with a vehicle movable therealong, of a normally closed track-circuit including a resistance insulated from the main rails of the line of way, a short circuit governed by the moving vehicle and controlled by current in the track-circuit and adapted to short-circuit said resistance, and an electrically-operated device controlled by said short circuit.

5. The combination with a line of way and with a vehicle movable therealong, of a normally closed track-circuit including a resistance insulated from the main rails of the line of way, a short circuit on the vehicle controlled by current in the track-circuit and adapted to short-circuit said resistance, and an electrically-operated device controlled by said short circuit.

6. The combination with a line of way and with a vehicle movable therealong, of a normally closed track-circuit including a resistance, a short circuit on the vehicle controlled by current in the track-circuit and adapted to short-circuit said resistance, and an electrically-operated device carried on said vehicle and controlled by said short circuit.

7. The combination with a line of way and with a vehicle movable therealong, of a normally closed track-circuit including a track-contact and a resistance both insulated from the main rails of the line of way, a short circuit governed by the moving vehicle and adapted to short-circuit said resistance and including a traveling contact-maker for engaging said track-contact, and an electrically-operated device controlled by said short circuit.

8. The combination with a line of way and with a vehicle movable therealong, of a normally closed track-circuit including a resistance insulated from the main rails of the line of way, and a short circuit adapted to short-circuit said resistance and including a traveling contact-maker for engaging said track-contact and also including an electrically-operated device controlled by said short circuit.

9. The combination with a line of way and with a vehicle movable therealong, of a normally closed track-circuit including a pair of track-contacts and a resistance connecting said contacts, at least one of said contacts being insulated from the main rails of the line of way, a short circuit governed by the moving vehicle and including a pair of traveling contact-makers for engaging respectively said track-contacts, and an electrically-operated device controlled by said short circuit.

10. The combination with a line of way and with a vehicle moving therealong, of a track-circuit including a resistance and having a normal track-circuit-closing branch and a differentiated danger-signaling branch, a short circuit governed by the moving vehicle and controlled by current in the track-circuit and adapted to short-circuit said resistance, and an electrically-operated device controlled by said short circuit.

11. The combination with a line of way and with a vehicle movable therealong, of a normally closed track-circuit including a resistance and having a normally open danger-signaling branch controlled by a danger condition on the line of way, a short circuit governed by the moving vehicle and controlled by current in the track-circuit and adapted to short-circuit said resistance, and an electrically-operated device controlled by said short circuit.

12. The combination with a line of way and with a vehicle movable therealong, of a track-circuit including a resistance and having a normal track-circuit-closing branch and a differentiated danger-signaling branch, a short circuit governed by the moving vehicle and controlled by current in said danger-signaling branch and adapted to short-circuit said resistance, and an electrically-operated device controlled by said short circuit.

13. The combination with a line of way and with a vehicle movable therealong, of a track-circuit including a resistance in the main circuit and having a normal branch of high resistance and a danger-signaling branch of low resistance, a short circuit governed by the moving vehicle and controlled by current in the track-circuit and adapted to short-circuit said resistance in the main track-circuit, and an electrically-operated device controlled by said short circuit.

14. The combination with a line of way and with a vehicle movable therealong, of a main track-circuit including a pair of track-contacts and a resistance connecting said contacts said circuit having a normal branch of high resistance and a danger-signaling branch of low resistance, a short circuit governed by the moving vehicle and including a pair of traveling contact-makers for engaging respectively said track-contacts, and an electrically-operated device controlled by said short circuit.

15. The combination with a line of way and with a vehicle movable therealong, of a normally closed block-circuit, a normally closed signaling track-circuit governed by said block-circuit and including a resistance, a short circuit governed by the moving vehicle and controlled by current in said signaling-circuit and adapted to short-circuit said resistance, and an electrically-operated device controlled by said short circuit.

16. The combination with a line of way and with a vehicle movable therealong, of a normally closed block-circuit, a track-signal, a signaling track-circuit including a resistance in the main circuit and having a normal track-signal-operating branch of high resistance and a danger-signaling branch of low resistance, a short circuit governed by the moving vehicle and controlled by current in said danger-signaling branch and adapted to short-circuit said resistance in said main signaling-circuit, and an electrically-operated device controlled by said short circuit.

17. The combination with a line of way and with a vehicle movable therealong, of a normally closed track-circuit including a source of energy and a resistance in the main circuit and having a reserve branch including a reserve source of energy and controlled by said main circuit, a short circuit governed by the moving vehicle and controlled by current in the track-circuit and adapted to short-circuit said resistance in the main track-circuit, and an electrically-operated device controlled by said short circuit.

18. The combination with a line of way and with a vehicle movable therealong, of an automatic controller governing the movement of said vehicle, a track-contact rail, and a rotary traveling contact-maker coöperative with said rail and governing the operation of said automatic controller and having a rim the periphery of which is convex in cross-section.

19. The combination with a line of way divided into blocks and with a vehicle movable along said line of way, of a series of track-contact rails one for each block each rail being vertically inclined upward from the end toward the center of the rail at its contact-making end, an automatic controller governing the movement of said vehicle, and a traveling contact-maker coöperative with said rails and governing the operation of said automatic controller.

20. The combination with a line of way and with a vehicle movable therealong, of a track-contact rail vertically inclined upward toward the center of the rail at its contact-making end, an automatic controller governing the movement of said vehicle, and a rotary traveling contact-maker coöperative with said rail and governing the operation of said automatic controller and having a rim the periphery of which is convex in cross-section.

21. The combination with a line of way and with a power-operated vehicle movable therealong, of manual and automatic controllers for governing the movement of said vehicle, automatic-controller-actuating means governed by a danger condition on the line of way, and automatic-controller-resetting means.

22. The combination with a line of way and with a power-operated vehicle movable therealong, of manual and automatic controllers for governing the movement of said vehicle, automatic-controller-actuating means governed by a danger condition on the line of way, and automatic-controller-resetting means governed by said manual controller and independent of the power mechanism for operating said vehicle.

23. The combination with a line of way and with a power-operated vehicle movable therealong, of manual and automatic controllers for stopping said vehicle, automatic-controller-actuating means governed by a danger condition on the line of way, and automatic-controller-resetting means governed by said manual controller and independent of the power mechanism for operating said vehicle.

24. The combination with a line of way and with a power-operated vehicle movable therealong, of a brake, manual and automatic power-controlling and brake-controlling means, actuating means governing said automatic controlling means and governed by a danger condition on the line of way, and resetting means governing said automatic controlling means and governed by said manual controlling means and independent of the power mechanism for operating said vehicle.

25. The combination with a line of way and with a vehicle movable therealong and operated by fluid-pressure, of a throttle-valve, manual and automatic throttle-valve controllers, automatic-controller-actuating means governed by a danger condition on the line of way, and automatic-controller-resetting means governed by said manual controller and independent of the power mechanism for operating said vehicle.

26. The combination with a line of way and with a vehicle movable therealong and operated by fluid-pressure, of a throttle-valve, a brake, manual and automatic throttle-valve and brake-controlling means, actuating means governing said automatic controlling means and governed by a danger condition on the line of way, and resetting means governing said automatic controlling means and governed by said manual controlling means and independent of the power mechanism for operating said vehicle.

27. The combination with a line of way and with a vehicle movable therealong, of a brake, manual power-controlling and brake-controlling means, an automatic power-controller, an automatic brake-controller, an actuating device common to said automatic power and brake controllers and governed by a danger condition on the line of way, and resetting means for said automatic power and brake controllers and independent of the power mechanism for operating said vehicle.

28. The combination with a line of way and with a vehicle movable therealong, of a brake, manual power-controlling and brake-controlling means, an automatic power-controller, an automatic brake-controller, an actuating device common to said automatic power and brake controllers and governed by a danger condition on the line of way, and resetting means governed by said manual controlling means and governing said automatic power and brake controllers and independent of the power mechanism for operating said vehicle.

29. The combination with a line of way and with a vehicle movable therealong, of a fluid-pressure brake, a manual brake-controller, an automatic brake-controller, automatic-controller-actuating means governed by a danger condition on the line of way, and automatic-controller-resetting means governed by said manual controller and independent of the power mechanism for operating said vehicle.

30. The combination with a line of way and with a vehicle movable therealong, of a vacuum-brake, a manual brake-controller, an automatic brake-controller, automatic-controller-actuating means governed by a danger condition on the line of way, and automatic-controller-resetting means governed by said manual controller and independent of the power mechanism for operating said vehicle.

31. The combination with a line of way and with a vehicle movable therealong, of a fluid-pressure brake, a manually-operated brake-controlling valve, an automatic brake-controlling valve, means governed by a danger condition on the line of way for actuating said automatic valve, and an automatic valve-resetting device governed by the manually-operated valve-controller and independent of the power mechanism for operating said vehicle.

32. The combination with a line of way and with a vehicle movable therealong, of a vacuum-brake, a manually-operated vacuum-relieving brake-valve, an automatic vacuum-relieving brake-valve, means governed by a danger condition on the line of way for opening said automatic valve, and an automatic valve-closing device governed by the manually-operated valve-controller and independent of the power mechanism for operating said vehicle.

33. The combination with a line of way and with a vehicle movable therealong, of manual and automatic controllers for governing the movement of said vehicle, automatic-controller-actuating means governed by a danger condition on the line of way, an automatic-controller-resetting device operated by fluid-pressure, and a fluid-pressure-controlling valve governed by said manual controller and independent of the power mechanism for operating said vehicle.

34. The combination with a line of way and with a vehicle movable therealong, of manual and automatic controllers for governing the movement of said vehicle, automatic-controller-actuating means governed by a danger condition on the line of way, automatic-controller-resetting means, and a by-pass actuator governed by said manual controller and governing said resetting means.

35. The combination with a line of way and with a vehicle movable therealong, of manual and automatic controllers for governing the movement of said vehicle, automatic-controller-actuating means governed by a danger condition on the line of way, an automatic-controller-resetting device operated by fluid-pressure, a fluid-pressure-controlling valve, and a by-pass valve-actuator governed by said manual controller.

36. The combination with a line of way and with a vehicle movable therealong, of manual and automatic controllers for governing the movement of said vehicle, an automatic-controller actuator normally tending to operate said controller, an electrically-controlled actuator-releasing device governed by a danger condition on the line of way, and automatic-controller-resetting means governed by said manual controller and independent of the power mechanism for operating said vehicle.

37. The combination with a line of way and with a vehicle movable therealong, of a manual controller for governing the movement of said vehicle, an automatic controller operated by fluid-pressure and also governing the movement of said vehicle, automatic-controller-actuating means governed by a danger condition on the line of way, and automatic-controller-resetting means governed by said manual controller and independent of the power mechanism for operating said vehicle.

38. The combination with a line of way and with a power-operated vehicle movable therealong, of a fluid-pressure brake system, manual power-controlling and brake-controlling means, automatic power-controlling and brake-controlling means operated by fluid-pressure from said brake system, actuating means governing said automatic controlling means and governed by a danger condition on the line of way, and automatic-controller-resetting means governed by said manual controller and independent of the power mechanism for operating said vehicle.

39. The combination with a line of way and with a power-operated vehicle movable therealong, of a vacuum-brake system, manual power-controlling and brake-controlling means, automatic power-controlling and brake-controlling means operated by atmospheric pressure in said brake system, actuating means governing said automatic controlling means and governed by a danger condition on the line of way, and automatic-controller-resetting means governed by said manual controller and independent of the power mechanism for operating said vehicle.

40. The combination with a line of way and with a power-operated vehicle movable therealong, of a brake, automatic power and brake controlling means having a controlling action of gradually-increasing efficiency, and automatic actuating means governing said controlling means and governed by a danger condition on the line of way.

41. The combination with a line of way and with a vehicle movable therealong and operated by fluid-pressure, of a throttle-valve controlling said fluid-pressure, a brake, automatic throttle-valve and brake controlling means having a controlling action of gradually-increasing efficiency, and automatic actuating means governing said controlling means and governed by a danger condition on the line of way.

42. The combination with a line of way and with a vehicle movable therealong and operated by fluid-pressure, of a throttle-valve controlling said fluid-pressure, a fluid-pressure brake, an automatic pressure-regulating valve controlling said throttle-valve and said brake and having a controlling action of gradually-increasing efficiency, and automatic valve-actuating means governed by a danger condition on the line of way.

43. The combination with a line of way and with a vehicle movable therealong and operated by fluid-pressure, of a vacuum system, a vacuum-brake, a throttle-valve controlling the motive-fluid pressure of the vehicle and controlled by said vacuum system, an automatic vacuum-reducing valve having a controlling action of gradually-increasing efficiency, and automatic valve-actuating means governed by a danger condition on the line of way.

44. The combination with a line of way and with a vehicle movable therealong, of manual and automatic controllers for governing the movement of said vehicle, an automatic-controller actuator normally tending to operate said controller, an actuator-releasing device governed by a danger condition on the line of way, and automatic-controller-resetting means governed by said manual controller.

45. The combination with a line of way and with a power-operated vehicle movable therealong, of a vacuum system including a vacuum-brake, manual power-controlling and brake-controlling means, automatic power-controlling and brake-controlling means governing said vacuum system, and actuating means governing said automatic controlling means and governed by a danger condition on the line of way.

46. The combination with a line of way and with a vehicle movable therealong and operated by fluid-pressure, of a throttle-valve, a vacuum system including a vacuum-brake and controlling said throttle-valve, automatic vacuum-reducing throttle-valve and brake-controlling means, and actuating means governing said automatic controlling means and governed by a danger condition on the line of way.

47. The combination with a line of way and with a vehicle movable therealong and operated by fluid-pressure, of a throttle-valve, a vacuum train-pipe, a vacuum-brake controlled by the pressure in said train-pipe, a vacuum-chamber in communication with said train-pipe, a throttle-valve-actuating piston in said vacuum-chamber, an automatic relief-valve controlling the pressure in said train-pipe, and relief-valve-actuating means governed by a danger condition on the line of way.

48. The combination with a line of way and with a vehicle movable therealong and operated by fluid-pressure, of a throttle-valve, a vacuum train-pipe, a vacuum-brake controlled by the pressure in said train-pipe, a vacuum-chamber in communication with said train-pipe, a throttle-valve-actuating piston in said vacuum-chamber, a manual controller governing the pressure in the train-pipe, an automatic relief-valve also controlling the pressure in said train-pipe, relief-valve-actuating means governed by a danger condition on the line of way, and relief-valve-resetting means governed by said manual controller.

49. The combination with a line of way and with a vehicle movable therealong, of a vacuum system having a flaring air-inlet and including a vacuum-brake, an automatic vacuum-reducing valve, and valve-actuating means governed by a danger condition on the line of way.

Signed at New York, in the county of New York and State of New York, this 13th day of December, A. D. 1901.

FRANK E. KINSMAN.

Witnesses:
C. S. CHAMPION,
R. CHAMPION.